United States Patent
Thøgersen

(10) Patent No.: US 8,632,293 B2
(45) Date of Patent: Jan. 21, 2014

(54) CART FOR TRANSPORT AND STORAGE OF ITEMS

(75) Inventor: Lars Thøgersen, København S (DK)

(73) Assignee: BBHS A/S, Copenhagen (DK)

( * ) Notice: Subject to any disclaimer, the term of this patent is extended or adjusted under 35 U.S.C. 154(b) by 558 days.

(21) Appl. No.: 12/377,930

(22) PCT Filed: Aug. 17, 2007

(86) PCT No.: PCT/EP2007/058596
§ 371 (c)(1),
(2), (4) Date: Aug. 11, 2009

(87) PCT Pub. No.: WO2008/020084
PCT Pub. Date: Feb. 21, 2008

(65) Prior Publication Data
US 2010/0129184 A1    May 27, 2010

(30) Foreign Application Priority Data
Aug. 18, 2006  (EP) ................................. 06017237

(51) Int. Cl.
*B60P 1/52*     (2006.01)
(52) U.S. Cl.
USPC ........... 414/536; 414/339; 280/408; 280/79.3
(58) Field of Classification Search
USPC .............. 414/339, 529–536; 280/408, 411.1, 280/412, 33.995, 79.11, 79.2, 79.3; 410/1; 186/63–65
See application file for complete search history.

(56) References Cited

U.S. PATENT DOCUMENTS

| | | | | |
|---|---|---|---|---|
| 2,904,196 | A | * | 9/1959 | Teixeira .................... 414/534 |
| 3,429,403 | A | * | 2/1969 | Drechsler et al. ............. 186/63 |
| 3,561,625 | A | * | 2/1971 | Dioguardi et al. ............ 414/533 |
| 3,628,807 | A | * | 12/1971 | Fullington et al. ........... 280/79.3 |
| 3,675,798 | A | * | 7/1972 | Carder et al. ................. 414/533 |
| 3,679,075 | A | * | 7/1972 | Guyaux et al. ............... 414/533 |
| 3,684,108 | A | * | 8/1972 | Olson .......................... 414/531 |
| 3,689,106 | A | | 9/1972 | Young |
| 3,751,059 | A | * | 8/1973 | Dunder et al. ........... 280/33.995 |

(Continued)

FOREIGN PATENT DOCUMENTS

| | | |
|---|---|---|
| CH | 569605 A5 | 11/1975 |
| EP | 1352815 A1 | 10/2003 |

(Continued)

OTHER PUBLICATIONS

English Translation of Japanese Office Action for Japanese Application No. 2009-525039 dated Oct. 24, 2012.

*Primary Examiner* — Jonathan Snelting
(74) *Attorney, Agent, or Firm* — Muncy, Geissler, Olds & Lowe, PLLC

(57) ABSTRACT

A cart for storage of items, such as air passenger luggage, and transport thereof between, e.g., airport sorting apparatus and aircrafts, comprises a chassis and a storage section. The storage section comprises one or more shelves, each of which is inclined with respect to the chassis, to allow items to be moved under the action of gravity between a loading end and an unloading end of the cart. A releasable closure structure is provided at the lower end of the shelf. The closure structure may form a continuation of the shelf when in its non-closing position. The cart is suited for automatic or manual loading and unloading of items.

22 Claims, 9 Drawing Sheets

(56) References Cited

U.S. PATENT DOCUMENTS

| | | | | |
|---|---|---|---|---|
| 3,780,894 | A | * | 12/1973 | Holmes et al. .................. 414/485 |
| 3,782,569 | A | * | 1/1974 | Montgomery ................. 414/476 |
| 4,411,349 | A | * | 10/1983 | Stedman et al. ............ 193/35 R |
| 4,756,660 | A | * | 7/1988 | Cesarini ........................ 414/536 |
| 4,966,515 | A | * | 10/1990 | Van Niekerk ................. 414/528 |
| 5,605,427 | A | * | 2/1997 | Hammond .................... 414/276 |
| 5,730,252 | A | * | 3/1998 | Herbinet .......................... 186/52 |
| 5,735,661 | A | * | 4/1998 | De Frondeville et al. ..... 414/276 |
| 6,132,158 | A | * | 10/2000 | Pfeiffer et al. ................. 414/276 |

FOREIGN PATENT DOCUMENTS

| | | |
|---|---|---|
| FR | 2870208 A | 11/2005 |
| JP | S60-31411 A | 2/1985 |
| JP | H02-25364 U | 2/1990 |
| JP | H02-80609 U | 6/1990 |
| JP | H03-297711 A | 12/1991 |
| JP | H07-21474 U | 4/1995 |
| JP | H10-291473 A | 11/1998 |
| JP | 2005-111779 A | 4/2005 |
| RU | 2114033 C1 | 6/1998 |
| RU | 2125531 C1 | 1/1999 |
| RU | 19009 U1 | 8/2001 |
| RU | 2003132267 A | 4/2003 |
| RU | 30694 U1 | 7/2003 |
| RU | 2239584 C2 | 11/2004 |
| RU | 2242908 C1 | 12/2004 |
| RU | 45683 U1 | 5/2005 |
| RU | 2271974 C1 | 3/2006 |
| SU | 239113 | 3/1969 |
| SU | 1713848 A1 | 2/1992 |

* cited by examiner

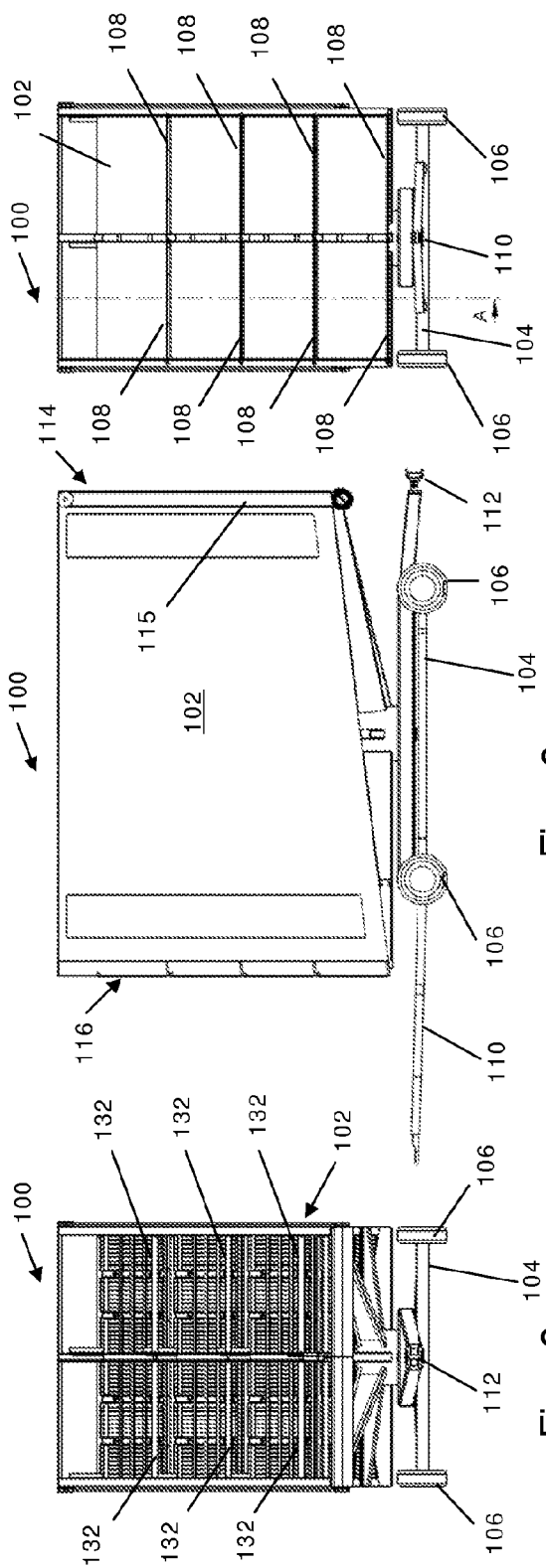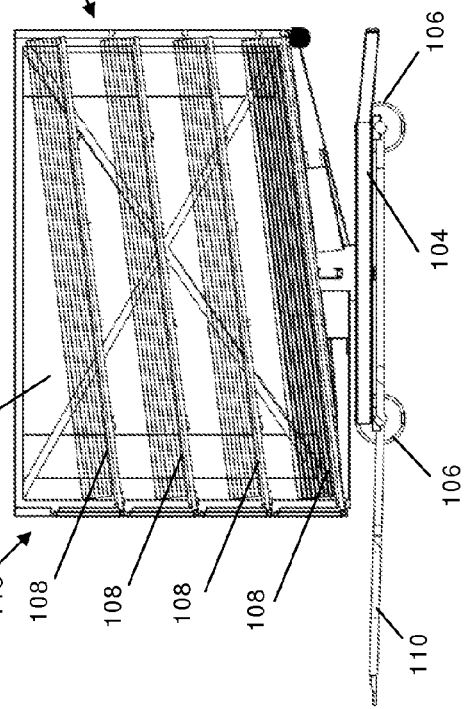

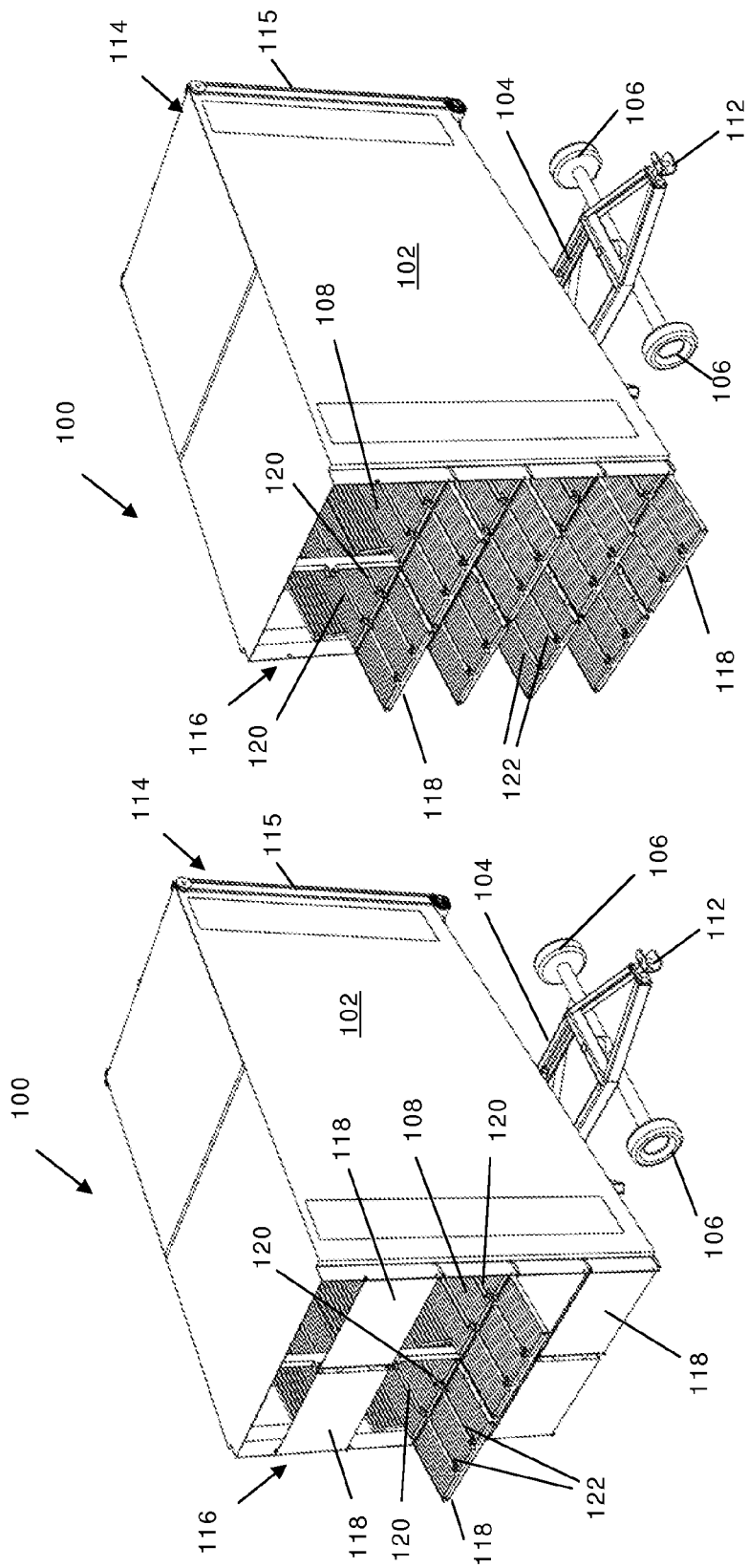

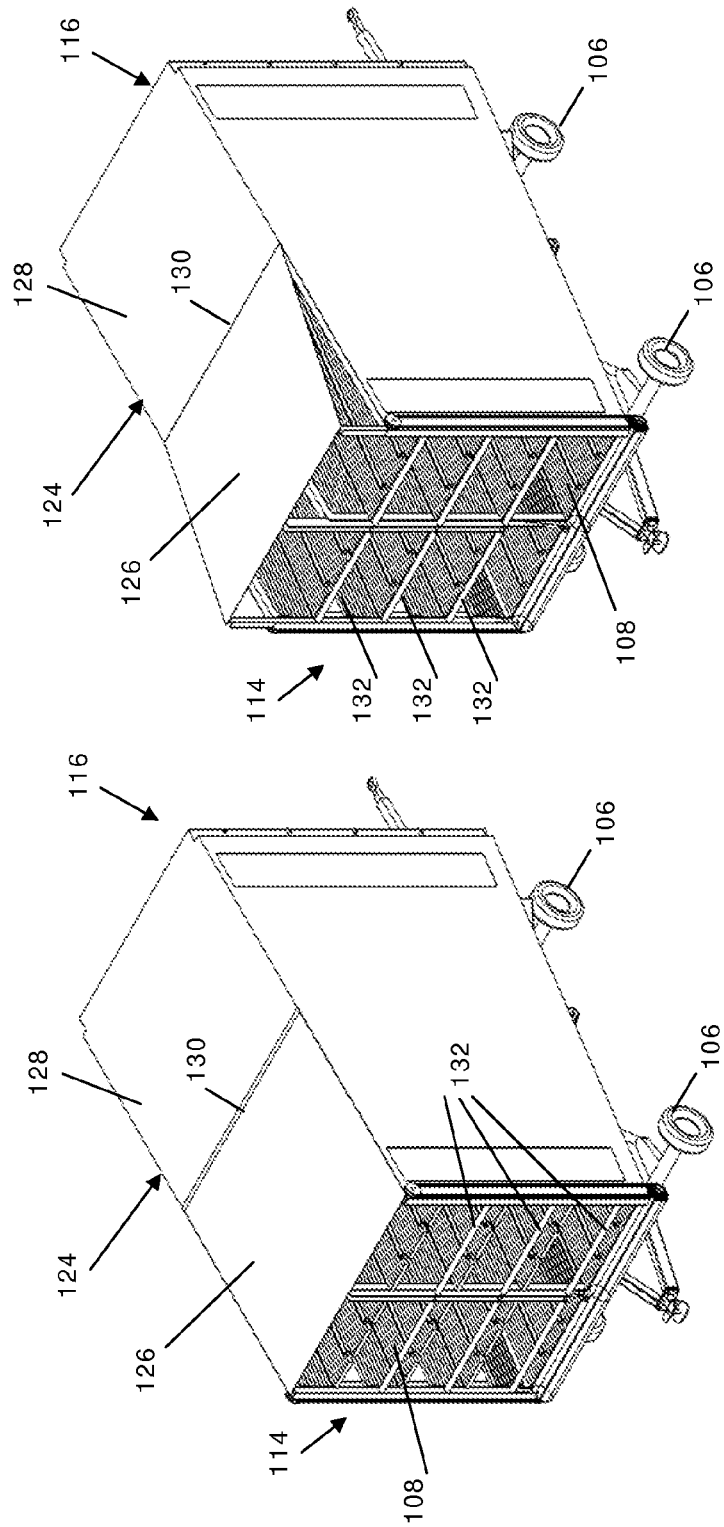

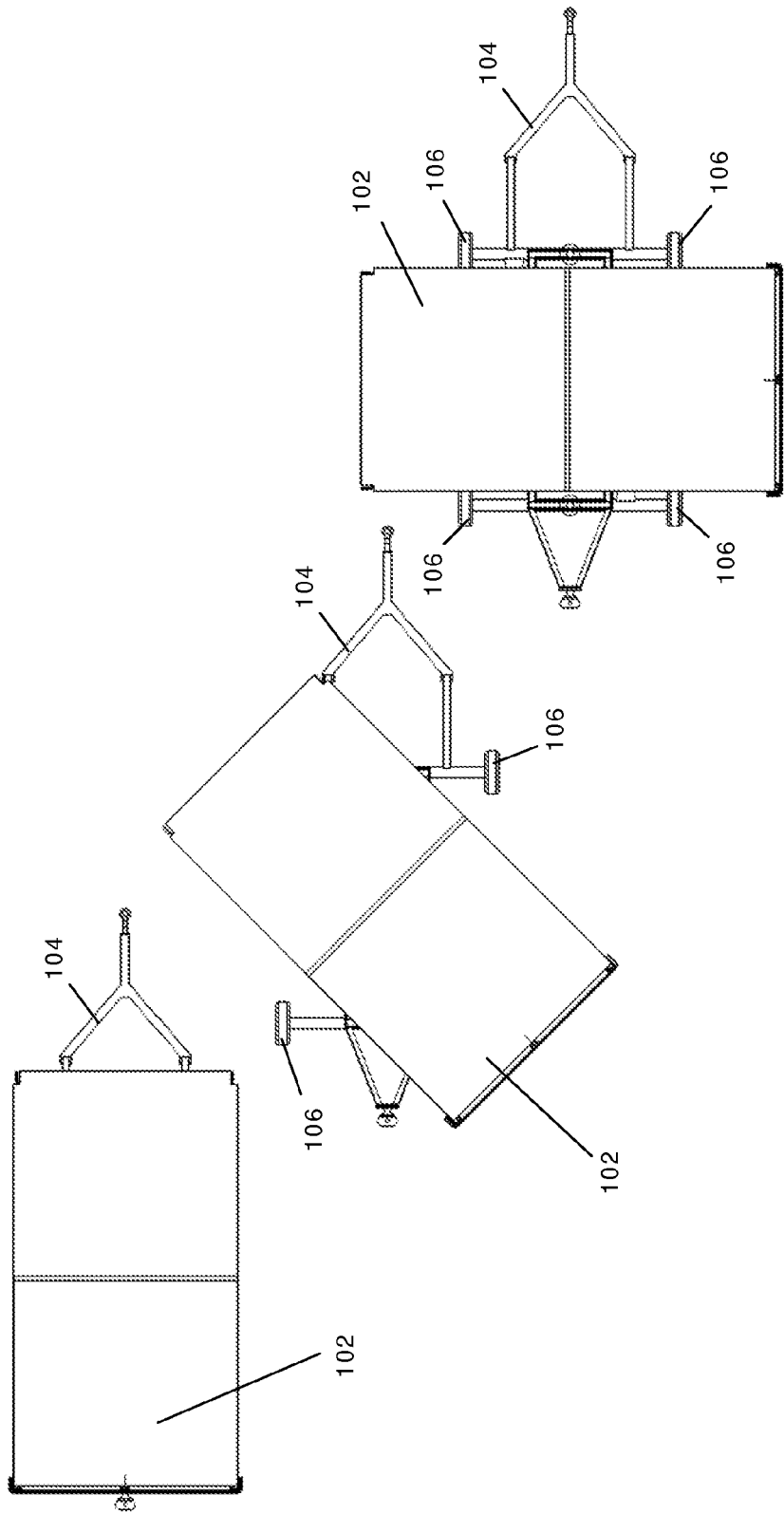

CART FOR TRANSPORT AND STORAGE OF ITEMS

TECHNICAL FIELD

The present invention relates to a cart for transport and storage of items, such as luggage items. The cart is particularly aimed at airport applications, for storing and transporting luggage items between luggage sorting or conveying apparatus and aircrafts.

BACKGROUND OF THE INVENTION

A large number of systems are known for transporting and storing various items and goods. Such systems are usually tailored for meeting specific requirements set by the nature, size and weight of the items or goods, as well as requirements regarding transport distances and transport velocity.

One specific field of interest of the present application is the field of transportation and storage of luggage items in airports. In most airports, checked-in luggage is usually conveyed from a plurality of check-in counters to a central luggage conveying and/or sorting apparatus, at which each luggage item is sorted according to its destination. Such conveying and/or sorting apparatus normally comprises a plurality of discharge units, in each of which luggage items destined for a particular aircraft are accumulated. The luggage items are then loaded onto carts or trolleys, by means of which the items are transported to the aircraft. The carts or trolleys may be self-propelled, or they may be attachable to a propelling unit (or tractor), which may be arranged to pull a plurality of trolleys or carts coupled together to form a train.

DESCRIPTION OF THE INVENTION

It is an object of preferred embodiments of the present invention to provide a cart for transport and storage of items, which is generally applicable to various types of items, and which is particularly suited for handling of luggage-items in airports. It is a further object of preferred embodiments of the invention to provide a cart, which is capable of storing a plurality of items at a time, and which is easy to operate, in particular with regard to loading and unloading of items.

The invention provides a cart for transport and storage of items, comprising:

a chassis comprising a plurality of wheels, whereby the wheels' points of contact with a cart-supporting surface define a plane;

a storage section comprising:

at least one shelf, which is inclined with respect to said plane, the shelf thereby defining an upper end and a lower end, the upper end of the shelf being arranged being arranged at a loading end of the cart, and the lower end being arranged at an unloading end of the cart;

a releasable closure structure at the lower end of the shelf, the closure structure having a closing position, in which it retains items supported by the shelf in the cart, and an open, non-closing position, in which items may be removed from the cart at the lower end of the shelf.

Thanks to the inclination of the shelf, items loaded at the loading end of the cart are automatically conveyed towards the unloading end of the cart under the action of gravity when the cart is placed on an essentially horizontal supporting surface. Hence, items may be accumulated on the shelf by simple serial loading from the loading end of the cart.

In particularly advantageous embodiments, the storage section may be rotatable with respect to the chassis around an upright axis. It may thus be possible to compensate for inaccurate parking of the cart at a loading or at an unloading spot, e.g. with respect to an automatic loading or unloading system. It may also be possible to park the cart while the storage section has one orientation with respect to the chassis and to load or unload items, while the storage section has another orientation with respect to the chassis. Thus, if manoeuvring space is limited at the parking spot, and parking is not possible with the storage section in its loading or unloading position, the cart may be parked with the storage section in a different position, provided that such a position allows parking at the desired spot. Once the cart is parked, the storage section may be rotated to its loading or unloading orientation with respect to the chassis. The storage section is preferably rotatable with respect to the chassis through an angle of at least 45 degrees, more preferably throught an angle of at least 90 degrees or at least 180 degrees, such as indefinitely rotatable.

Analogously, other types of movements of the storage section relative to the chassis are envisaged, such as translational displacement. Such displacement may be provided for in one dimension only, or in two or three dimensions.

Rotation or translation of the storage section relative to the chassis may be performed manually or in a motor- or actuator-assisted manner.

The shelf may be permanently inclined with respect to the above-mentioned place, defining a constant inclination angle. Alternatively, the inclination angle may permanently inclined, but with a variable inclination angle, or it may be non-permanently inclined, i.e. tiltable between an inclined position and a non-inclined position, in which it is essentially parallel to the above-mentioned chassis plane. The angle of inclination of the shelf with respect to the above-mentioned plane may in preferred embodiments be from about 3 to about 30 degrees, such as from about 3 to about 20 degrees, such as from about 3 to about 10 degrees, such as from about 3 to about 8 degrees, such as from about 3 to about 7 degrees.

To achieve the desired inclination, the storage section may be inclined relative to the chassis. Alternatively, or in addition, the shelf or shelves may be inclined relative to the storage section. In embodiments, in which the inclination angle of the at least one shelf is variable, such variable inclination may be achieved by variable inclination of the storage section relative to the chassis, preferably with the at least one shelf defining a fixed angle relative to the storage section. In such a manner, all shelves may be tilted simultaneously, and it may be achieved that all shelves define identical inclination angles. Alternatively, the at least one shelf may be tiltable relative to the storage section. In case of a plurality of shelves, a tiliting mechanism may be provided for individually inclining the shelves to individual inclination angles relative to the storage section and/or relative to the chassis. Alternatively, the tilting mechanism may tilt all shelves at a time to the same inclination angle relative to the storage section and/or relative to the chassis.

The shelf preferably forms a bottom surface of a compartment. The cart preferably comprises a plurality of shelves, which may be arranged in rows and/or columns. For example, the cart may comprise a plurality of rows and a plurality of columns, such as 2 or 3 columns, and 2-10 rows. For airport-luggage applications, the shelves may have a width from about 50 to about 200 cm, such as from about 80 to 120 cm. Their length may be from about 1.5 to about 8 m, such as from about 2 to about 5 m, such as from about 3 to about 5 m. The height of each compartment may be from about 20 to about 100 cm, such as from about 40 to about 80 cm, such as from about 50 to about 70 cm. In one embodiment, the width of each shelve is approximately 1 m, its length is about 4 m, the height of each compartment is about 60 cm, and the cart comprises 2 columns and 4 rows of shelves. Such an embodiment of the cart may accommodate approximately 30-40 luggage items.

Loading and unloading of the cart may be performed manually or automatically. The entire storage section may be detachable from the chassis to e.g. allow the storage section with its contents to be loaded onto an aircraft.

In order to aid transportation of items from the loading end of the cart to its unloading end under the action of gravity, the item-supporting surface of each shelf may optionally define a low friction with respect to the items. In one particularly interesting embodiment, at least a part of an upwardly-facing item-supporting surface of the shelf is defined by a plurality of rollable elements, along which an item may roll from the upper end to the lower end of the shelf. Likewise, a side portion of each compartment may be provided with a low-friction material and/or a plurality of rollable elements for reducing friction between sidewalls of each compartment and items. The rollable elements may e.g. comprise wheels or rollers made from a metal, such as steel or aluminium, or from a durable, low-friction plastics material, such as Teflon™.

The releasable closure structure may comprise a wall element, which extends upwardly at least in the closing position of the closure structure. The wall element may e.g. be removable or slidably arranged between its closing and its non-closing position. Alternatively, the upwardly extending wall element may be pivotal around a pivot line, which essentially extends parallel to a free end of the shelf, such that the wall element forms a continuation of the shelf in the non-closing position of the closing structure. In a yet further alternative embodiment, the wall element may be removable from its closing position and re-mountable to the cart in a non-closing position, in which it forms a continuation of the shelf. In embodiments, in which the wall element forms a continuation of the shelf in its non-closing position, that surface of the wall element, which faces and supports the items, may be provided with one or more rollable elements and/or a material of low surface friction to facilitate unloading of items from the cart.

Embodiments of the invention, which include a plurality of shelves, may comprise one wall element in respect of each shelf, so as to ensure that only one shelf is being unloaded at a time. Alternatively, one wall element may serve to close a plurality of shelves, e.g. all shelves in one row or in one column.

One or more wall elements forming a continuation of one or more shelves is/are particularly advantageous in case unloaded items are to be loaded onto a further transportation or storage device, such as a belt conveyor for loading luggage items onto an aircraft, whereby the wall elements may form bridges between the shelves and the belt conveyor.

The closure structure may, in addition to its closing function, serve as a bumper for items, which slide from the upper end of the shelf and hit the closure structure at the lower end of the shelf.

To prevent uncontrolled or accidental discharge of items from the shelf or shelves when the closure structure is in its non-closing position, the at least one shelf may comprise a first user-operable item-braking system for decelerating or arresting items conveyed under the action of gravity towards a lower end of the shelf. Likewise, if the closure structure comprises a wall element, which in the non-closing position of the closure structure forms a continuation of one or more shelves, the wall element may comprise a second user-operable item-braking system for decelerating or arresting items conveyed towards a free end of the wall element. The first and second item-braking systems may be operable together or independently. Operation may e.g. be performed by one or more user-operable handles or pedals provided on an exterior part of the cart. They may be powered, e.g. actuator-assisted or motor-assisted, or non-powered, in which case the required braking force is generated by an operator.

At least one of the first and second item-braking system may comprises at least one friction element, which is normally retracted to a non-braking position, in which it does not project from an upwardly-facing item-supporting surface defined by the shelf or by the wall element, respectively, and which is movable to a braking-position, in which it projects from said item-supporting surface. Each shelf and each wall element forming a continuation of the shelf may e.g. include a rail or a plurality of rails forming the aforementioned friction elements. To achieve a high friction between the friction elements and the items, at least upper surface portions of the friction elements may be provided with a coating or a surface layer of e.g. textured rubber.

The cart may include a roof section for at least partially covering the storage section to protect items stored therein from, e.g., rain. The roof section may extend parallel to the shelf or at an angle thereto, e.g. parallel to the above-mentioned plane, i.e. parallel to the supporting surface of the cart. The latter alternative is preferred in embodiments, in which it is desired to limit the height of the cart. In such embodiments, the available height above the shelf may be smaller at the loading end of the cart than at the unloading end. In order to allow loading of an item, which can be accommodated on the shelf at or near the unloading end of the cart, but which does not pass between the shelf and the roof at the loading end of the cart, at least a portion of the roof section near the loading end of the cart may be arranged to be lifted from a closed to a lifted position. Alternatively, or in addition, other portions of the roof may be liftable.

To couple the cart to a cart of the same type or to a propelling device, such as a tractor, the cart may comprise at least one coupling device. Preferably, separate coupling devices are provided at two opposite ends of the cart, and preferably such devices constitute mating pairs of coupling elements, so that one cart can be coupled to a cart having identical coupling elements.

A particular interesting embodiment of the present invention is one, in which the cart comprises coupling devices as outlined above, and in which the storage section is rotatable with respect to the chassis around an upright axis. In such an embodiment, a train of e.g. two carts may be parked at a loading or unloading spot, and the storage sections of the two carts may then be placed such that their respective loading ends face each other. This allows a human operator or an automatic loading device to conveniently load items into two carts with a minimum of mutual translational displacement between the carts and the items to be loaded. The same benefit is achieved with respect to unloading of items.

The cart may be entirely closed in the sense that closure elements may be provided at the loading and the unloading ends, and that outer walls, meshes or like elements may be provided, which prevent access to the interior of the storage section. A lockable access system may be provided to prevent unauthorized access.

In order to determine if there has been unauthorized access to the cart between that point in time, at which it is loaded, and that point in time, at which it is unloaded, the storage section may comprise a tamper-proof access system. Such a system may include mechanical elements, such as one or more straps or adhesive labels, which are broken upon opening of the storage section, or it may include electronic means, such as radio frequency tags, infrared sensors, light-emitting diodes and photo sensors or like equipment, which may provide an appropriate output warning signal, if it is detected that the storage section is being opened.

In order to allow a human or automatic operator to easily determine the orientation of the storage section with respect to the chassis, external information insignia may be provided on the cart for identifying the loading and/or the unloading end of the storage section. Such information insignia may in one simple embodiment simply consist of the storage section having different heights at its loading and unloading ends. Alternative optical means may be provided, such as letters, colour marks, etc., or electronic means may be included, such as radio frequency tags, infrared sensors, light-emitting diodes and photo sensors, etc.

Information insignia, or communication or control means may also be provided in or on the cart to aid correct positioning of the cart relative to a loading station or loading unit, such as an automatic loading unit. For example, electronic, mechanical or optical communication or control means may be provided for controlling positioning of the cart at the loading station, e.g. by communication with a control unit at the loading station, or by steering of the cart relative to the loading station in response to signals obtained by the communication or control means, such signals being indicative of the position of the cart relative to the loading station. The above-mentioned information insignia, or communication or control means may analogously allow positioning of the cart relative to an unloading station.

The at least one shelf may be removable from the cart to allow cleaning, maintenance and exchange thereof. If the cart comprises a plurality of shelves, each one of them may preferably be independently removable for independent maintenance and cleaning. The shelves may be at least partially open, i.e. open to such an extent that water, cleaning liquids or other liquid substances may allow to drip off the shelves to a bottom portion of the storage section. The storage section may itself have an open bottom section, i.e. a bottom section, which allows the aforementioned liquids to drip off the storage section.

To prevent undesired or accidental movement of the cart when the closure structure is in its non-closing position, the cart may comprise a wheel-braking system, which is arranged to automatically brake the wheels when the closure structure is in its non-closing position. The wheel-braking system may be releasable by user-interaction while the closure structure is in its non-closing position, or it may, alternatively, be releasable only when the closure structure is in its closing position. Adequate coupling of the closure structure and the wheel-braking system may be provided via mechanical means or via computer-controlled electronic means, or a combination thereof.

DESCRIPTION OF THE DRAWINGS

An embodiment of the invention will now be described with reference to the drawings, in which:

FIGS. 1-3 are side views of an embodiment of a cart according to the invention;

FIG. 4 is a cross-sectional view along line A-A in FIG. 1;

FIGS. 5-8 are perspective illustrations of the embodiment of FIGS. 1-4;

FIGS. 9-11 are illustrations of different configurations of the embodiment of FIGS. 1-8;

Figure 12:
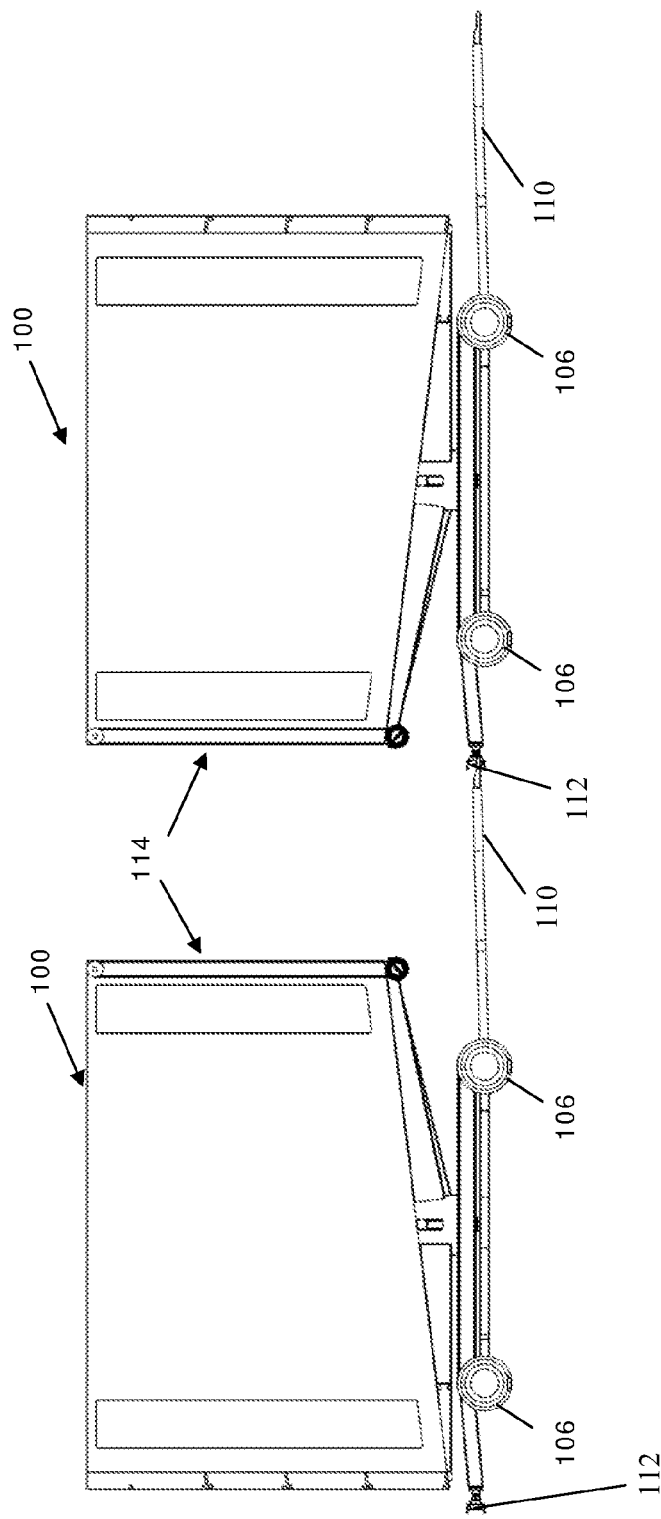
FIG. 12 is an illustration of two carts of the type depicted in FIGS. 1-11 coupled together.

The cart 100 of FIGS. 1-12 includes a storage section 102 mounted on a chassis 104, the chassis being supported by four wheels 106. The storage section 102 includes eight shelves 108 arranged in two columns and four rows. The chassis 104 includes a rear coupling element 110, and a front coupling element 112, the rear and front coupling elements constituting mating pairs of coupling elements. As shown in the cross-sectional view of FIG. 4, the shelves 108 are inclined with respect to the chassis 104 and extend from a loading end 114 of the storage section 102 to an unloading end 116, the lower end of the shelves 108 being at the unloading end of the cart. A hoisting apparatus 115 is provided at the loading end 114 of the cart for opening and closing a loading-end closure element.

The wheels 106 may be arranged on supports in pairs, i.e. so that a front pair of wheels is supported by one supporting element, and a rear pair of wheels is supported by another supporting element. For improved manoeuvrability of the cart, each pair of supporting elements is preferably rotatably mounted with respect to the chassis 104 to allow each support and hence each pair of wheels to rotate around a vertical axis with respect to the chassis.

FIGS. 5 and 6 show the cart 100 viewed from the unloading end 116 of the storage section 102. A closure structure is provided, comprising wall elements 118, which are pivotable with respect to the shelves 108. The wall elements 118 may be individually pivotable between their closing position and the non-closing position, in which a surface of each wall element 118 forms a continuation of the associated shelf 108. Alternatively, the wall elements may be coupled, such that they are opened and closed pair-wise. As illustrated in FIGS. 5-8, each shelf 108 forms a bottom surface of a compartment for accommodating a plurality of items loaded from the loading end 114. The item-supporting surfaces of the shelves 108 are constituted by a plurality of rows of rollers for facilitating transport of items under the action of gravity. Like rows of rollers are provided on those surfaces of the wall elements 118, which face upwardly, when the wall elements are in their open, i.e. non-closing, position.

As shown in FIGS. 5 and 6, braking rails 120 are provided between some of the rows of rollers of the shelves 108. Likewise, braking rails 122 are provided between rows of rollers of the wall elements 118. The rails 120 and 122 can be operated to be movable between a non-braking position, in which the do not extend above the surface of the rollers, and a braking position, i.e. the position shown in FIGS. 5-8, in which they project from the surface of the rollers. The rails 120 and 122 may also be used as shaking elements for releasing articles, which might be frictionally stuck to the shelves 108.

Figure 13:
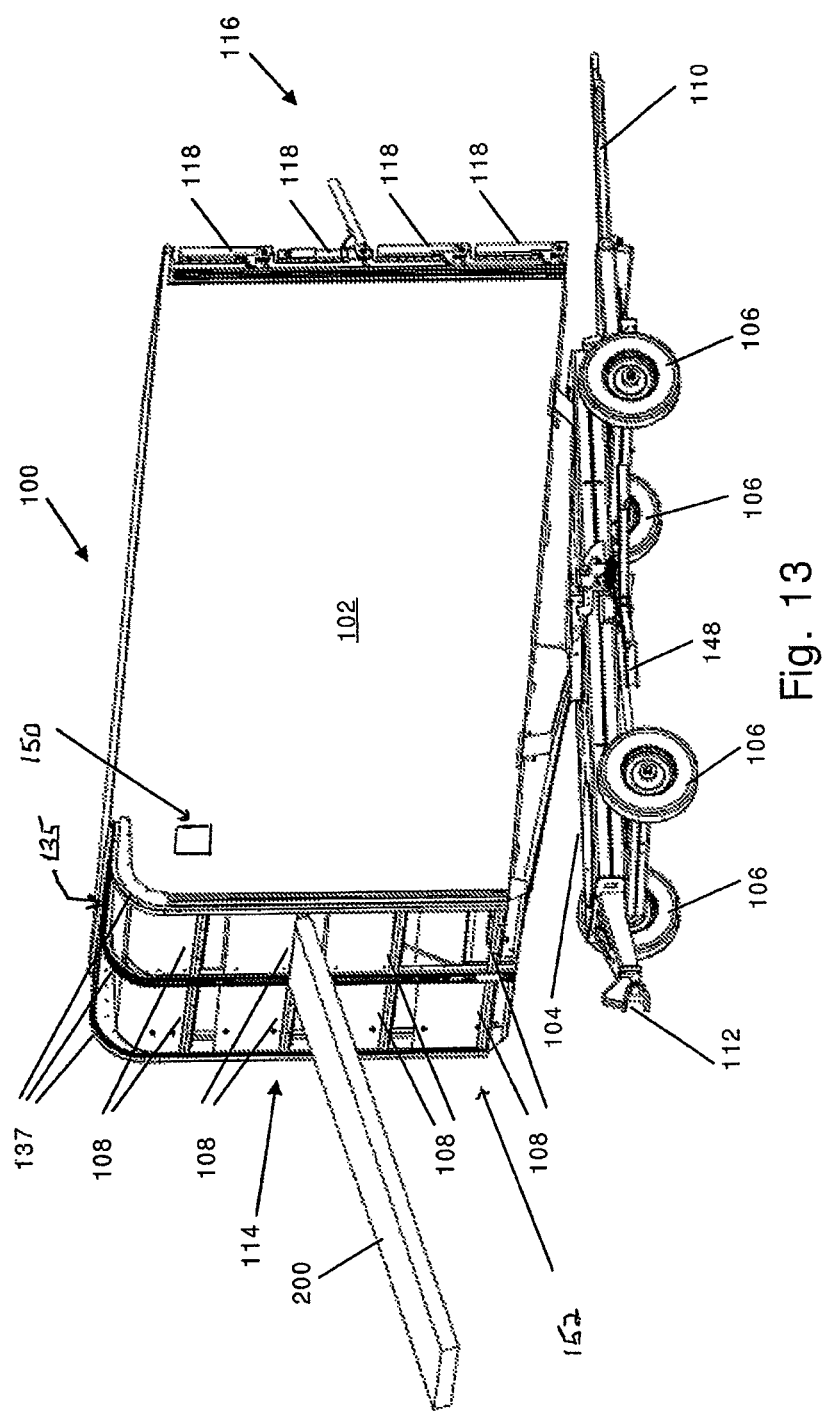
FIG. 13 shows a cart according to the present invention and an external belt loader.

As shown in FIGS. 7 and 8, a roof 124 of the storage section 102 comprises a front section 126 and a rear section 128. The front section 126 is liftable as shown in FIG. 8, lifting being achieved by pivotal mounting of the front section 126 with respect to the rear section 128 around pivot line 130. Thus, items which can be accommodated at the unloading end 116 of the cart, but which are too high to fit between the upper shelf and the roof 124, cf. also the cross-sectional illustration of FIG. 4, may be passed below the roof 124, when the front roof section 126 is in its lifted position. Alternatively, a tarpaulin 135 (shown in FIG. 13) may be provided for closing loading end 114 as well as an upper portion of the storage section 102. Hence, the tarpaulin 135 may serve both as an end well and as a portion of a roof section of the cart. Shown also in FIG. 13 are rails 137 for guiding the tarpaulin 135. As shown in FIGS. 7 and 8, loading-end closure elements 132 are provided in the form of cross bars preventing undesired or accidental discharge of items via the loading end 116 of the cart. In FIG. 7, the cross bars 132 are in their closing position, whereas in FIG. 8 they are shown in their non-closing position. As was discussed above, a lockable or tamper-proof access system access system 152 may be provided to prevent unauthorized access. This lockable or tamper-proof access system 152 can use various tamper-proof access system as have been discussed above. The particular location and type of lockable or tamper-proof access system can vary. Also, as discussed above, external information insignia 150 or other communication or control means may be provided on the cart. While FIG. 13 only generically indicates one insignia 150, its location, number, shape or size can be varied as would be appreciated by one skilled in the art.

Rotation of the storage section 102 with respect to the chassis 104 is illustrated in FIGS. 9-11. As show, the storage section is rotatable through and angle of at least 90 degrees. Preferably, the storage section is infinitely rotatable in a hub in the chassis 104.

In FIG. 12, mutual coupling of two identical carts 100 via coupling elements 110 and 112 is illustrated. In the configuration of FIG. 12, a loading operator or loading device may pass between the respective loading ends 114 of the two carts 100 and load each one of them by left and right discharge into the carts.

In FIG. 13 the cart 100 is shown in association with an external belt loader 200 at the loading end 114 for loading articles onto the shelves 108 of the cart, e.g. from an aircraft. The external belt loader may be pivotal to adjust its angle of inclination. Similarly, for unloading of articles from the cart 100, e.g. with the purpose of loading the articles onto an aircraft, the belt loader 200 may be placed at the unloading end 116 of the cart.

Figure 14:
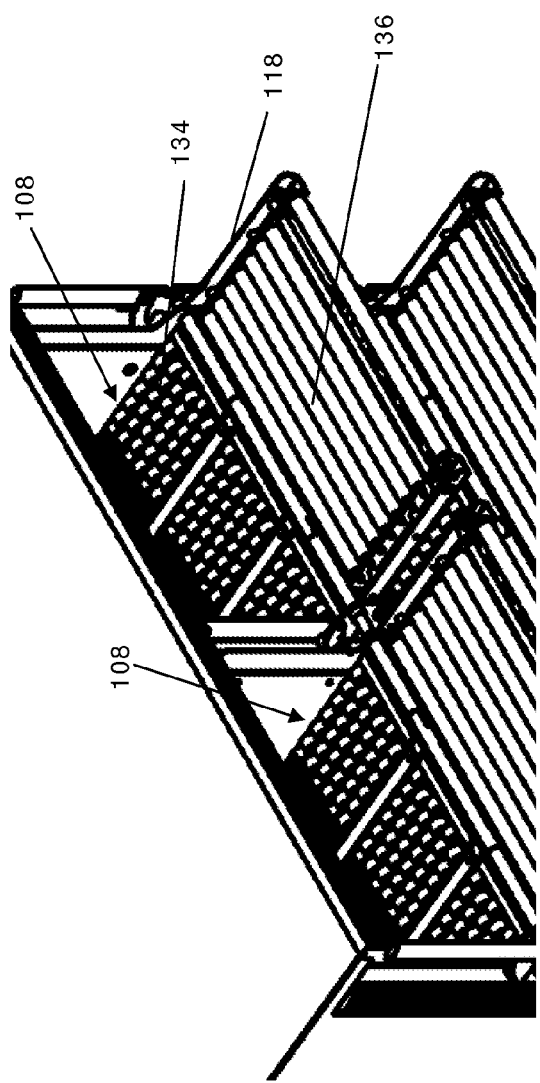
FIG. 14 shows a detail of shelves of a cart according to the present invention.

FIG. 14 shows a detail of an embodiment of shelves 108 and wall elements 118. In this embodiment, each of the shelves 108 comprises a plurality of cylindrical rollers 134 arranged in rows to form the shelf 108. More specifically, the rollers 134 are aligned along longitudinal rows, i.e. aligned in a direction extending between the loading and unloading ends of the cart, 114 and 116 respectively. In a transverse direction, the rollers 134 are mutually offset, such that every roller is aligned with the second but next neighbouring roller, while being longitudinally offset from the neighbouring roller. The diameter of the rollers 134 is preferably between 1 and 10 cm, such as between 2 and 5 cm. In the embodiment shown, the rollers are provided in modules, whereby each shelf 108 is composed of three modules. It has been found that embodiments, in which the shelves 108 comprise such rollers arranged as described above, or in which the shelves 108 are entirely composed of such rollers, a relatively low angle of inclination of the shelves suffices to efficiently convey articles under the action of gravity from the loading end 114 of the cart to the unloading end 116. Hence the space available for the cart in an upright direction, which is most often restricted, can be utilized to a maximum extent. That surface of the wall elements 118, which forms an extension of the shelves 108, when the wall elements 118 are in their non-closing position, may advantageously be formed by a plurality of transversely extending cylindrical rollers 136 having a diameter of about 2-10 cm, such as about 2-6 cm.

Figure 15:
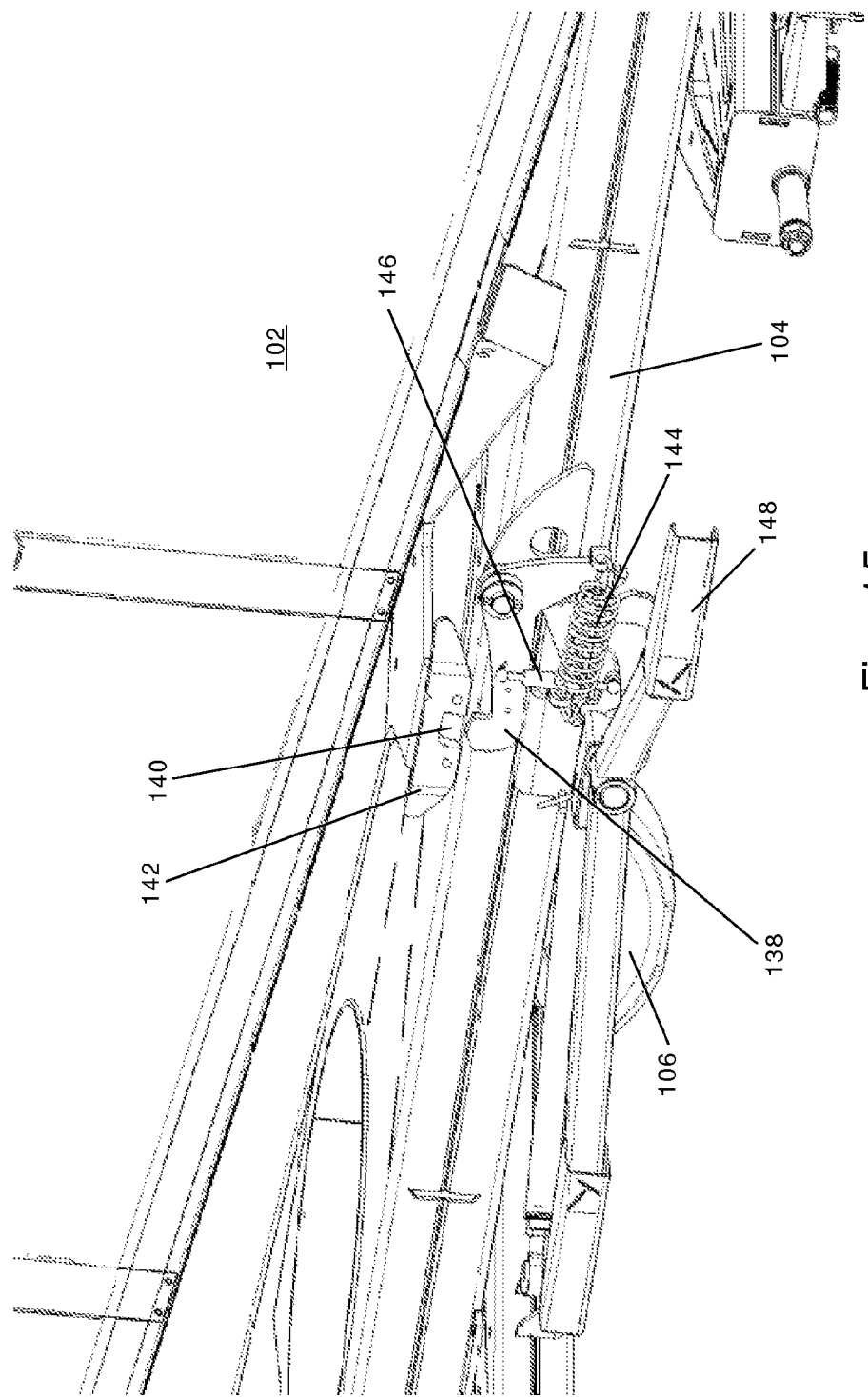
FIGS. 15 and 16 illustrate a mechanism for controlling rotation of a storage section of the cart with respect to a chassis thereof.
Figure 16:
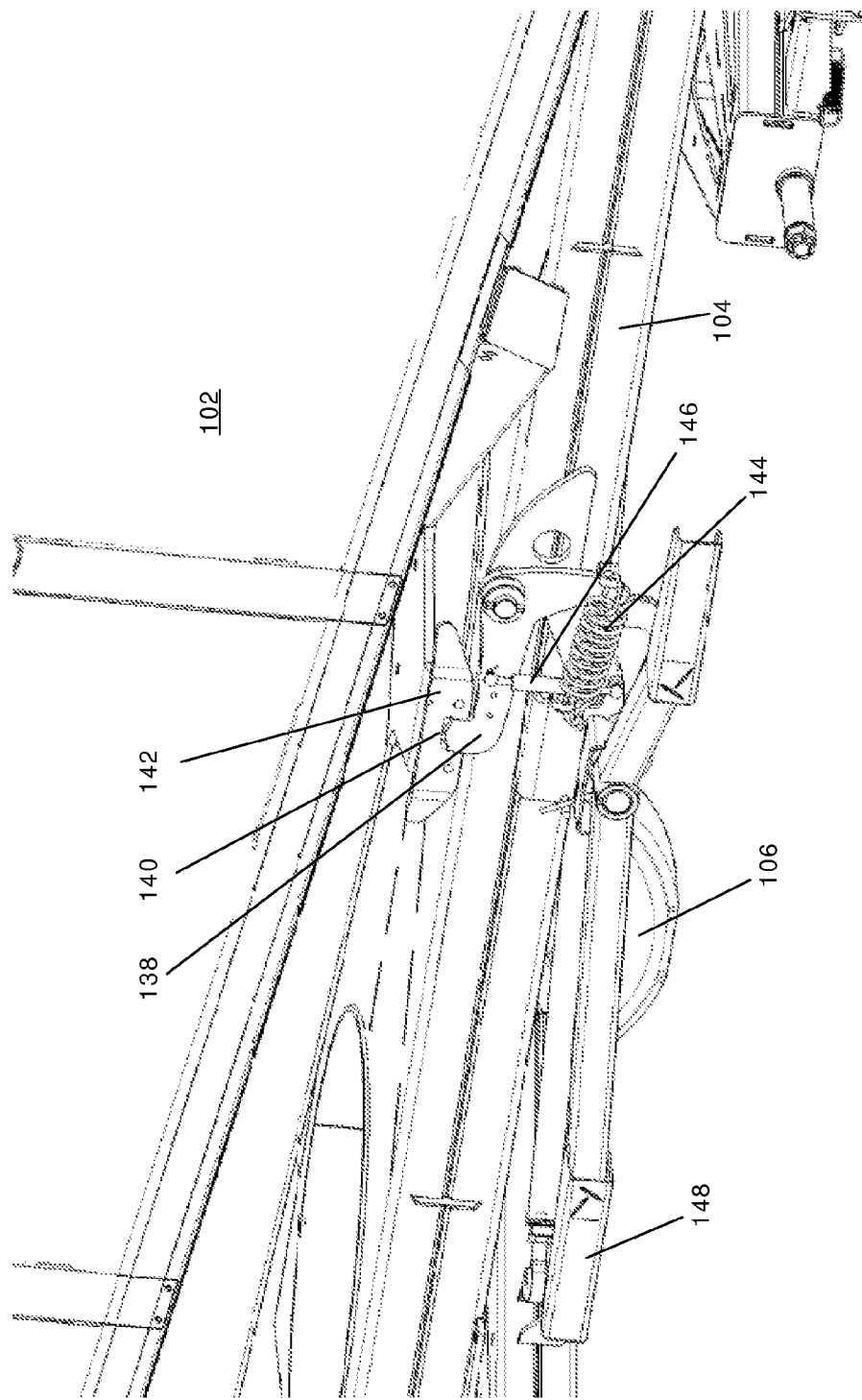

FIGS. 15 and 16 illustrate a mechanism for controlling rotation of the storage section 102 of the cart with respect to the chassis 104. The mechanism comprises a latch 138 arranged on the chassis 104, the latch being engageable with a notch 140 formed in a notch element 142, which is fixed to the storage section 102. The latch 138 is spring-biased by means of spring 144. When the latch 138 engages the notch 140, as shown in FIG. 16, the storage section 102 is in a predefined position with respect to the chassis 104, i.e. the storage section 102 is rotated around an upright axis with respect to the chassis to a position, in which a distal end of the latch 138 fits into the notch 140. Such a position may e.g. be the position shown in FIG. 9, in which the storage section 102 extends parallel with the chassis 104, or it may e.g. be the position shown in FIG. 11, in which the storage section 102 extends transversely to the chassis 104. When the storage section 102 is rotated around the upright axis to position different from the position, in which the distal end of the latch 138 may engage the notch 140, the notch element 142 will be out of angular alignment with the distal end of the latch 138, and hence the storage section may rotate freely.

In order to avoid unacceptably high acceleration forces on articles stored in the cart when the latch 138 engages the notch 140, there is provided a delay element in the form of a gas cylinder 146. The force provided by the gas cylinder 146 acts to delay engagement of the latch 138 with the notch 142. Hence, if the storage section is rotated with a relatively high angular velocity with respect to the chassis, the extended response time of the latch 138 prevents the latch from engaging the notch 142. Due to the gas cylinder 146, the latch 138 only engages the notch 142, when the storage section 102 is rotated at a relatively low angular velocity with respect to the chassis 104.

As shown in FIGS. 13, 15 and 16, a foot-operated braking mechanism 148 may further be provided.

The invention claimed is:

1. A cart for transport and storage of airport luggage items, comprising:
    a chassis comprising a plurality of wheels that make contact with a cart-supporting surface at respective points of contact, whereby the wheels' points of contact with the cart-supporting surface define a plane;
    a storage section rotatable with respect to an upright axis and comprising:
    a plurality of shelves, each of the shelves being inclined with respect to said plane, each of the shelves thereby defining an upper end and a lower end, the upper end of each of the shelves being arranged at a loading end of the cart, and the lower end being arranged at an unloading end of the cart, the upper end of each of the shelves being open and non-obstructed so that the airport luggage items can slide directly onto the shelf, and the lower end of each of the shelves being at an opposite end of the cart from the upper end;
    a releasable closure structure at the lower end of each of the shelves, the closure structure having a closing position, in which it retains the airport luggage items supported by the shelf in the cart, and an open, non-closing position, in which the airport luggage items may be removed from the cart at the lower end of the shelf,
    wherein the storage section is rotatable with respect to the chassis around the upright axis, and
    wherein each of the shelves is dimensioned to receive a plurality of the airport luggage items successively loaded onto the shelf from the upper end thereof and automatically conveyed from the upper end to the lower end of the shelf under the action of gravity due to the incline, so as to thereby successively accumulate the plurality of airport luggage items on the shelf.

2. The cart according to claim 1, wherein said at least one of the shelves has an upwardly-facing item-supporting surface, at least a part of which is defined by a plurality of rollable elements, along which an airport luggage item may roll from the upper end to the lower end of the at least one shelf.

3. The cart according to claim 1, wherein each of the shelves form a bottom portion of a compartment, the compartment further comprising at least one upwardly extending side portion, at least a part of which is defined by a plurality of rollable elements.

4. The cart according to claim 1, wherein the releasable closure structure comprises a wall element, which extends upwardly at least in the closing position of the closure structure.

5. The cart according to claim 4, wherein each of the wall elements are pivotal around a different pivot line, the pivot lines essentially extend parallel to a lower end of a respective shelf.

6. The cart according to claim 5, wherein individual wall elements form a continuation of the shelf to which they are connected in the non-closing position of the closing structure.

7. The cart according to claim 6, wherein each of the wall element comprises at least one rollable element, along which an airport luggage item may roll when the wall element forms said continuation of the shelf.

8. The cart according to claim 1, wherein at least one of the shelves has a first user-operable item-braking system for decelerating or arresting the airport luggage items conveyed under the action of gravity towards the lower end of the at least one shelf.

9. The cart according to claim 8, wherein the releasable closure structure comprises a wall element, which extends upwardly at least in the closing position of the closure structure, and wherein the wall element of the at least one shelf comprises a second user-operable item-braking system for decelerating or arresting the airport luggage items conveyed towards a free end of the wall element.

10. The cart according to claim 9, wherein at least one of the first and second item-braking system comprises at least one friction element, which is normally retracted to a non-braking position, in which it does not project from an upwardly-facing item-supporting surface defined by the at least one shelf or by the wall element, respectively, and which is movable to a braking-position, in which it projects from said item-supporting surface.

11. The cart according to claim 1, further comprising a roof section, at least a portion of which is arranged to be lifted from a closed position to a lifted position.

12. The cart according to claim 11, wherein the liftable portion of the roof section is near the loading end of the cart.

13. The cart according to claim 1, wherein the plurality of shelves all extend in a same direction at a same angle of inclination.

14. The cart according to claim 13, wherein each of the shelves forms a bottom surface of a compartment.

15. The cart according to claim 14, comprising a plurality of rows and columns of compartments.

16. The cart according to claim 1, further comprising at least one coupling device for coupling the cart to a second cart.

17. The cart according to claim 1, wherein the storage section comprises a lockable or tamper-proof access system.

18. The cart according to claim 1, further comprising external information insignia for identifying at least one of the loading and the unloading end of the cart.

19. The cart according to claim 1, wherein each shelf is permanently inclined with respect to said plane.

20. The cart according to claim 1, wherein at least one of the shelves is removable from the cart.

21. The cart according to claim 1, wherein at least one of the shelves and a bottom portion of the chassis are at least partially open.

22. The cart according to claim 1, further comprising a wheel-braking system, which is arranged to brake the wheels when the closure structure is in its non-closing position.

* * * * *

UNITED STATES PATENT AND TRADEMARK OFFICE
CERTIFICATE OF CORRECTION

PATENT NO.        : 8,632,293 B2                                    Page 1 of 1
APPLICATION NO.   : 12/377930
DATED             : January 21, 2014
INVENTOR(S)       : Lars Th\ogersen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 928 days.

Signed and Sealed this
Twenty-second Day of September, 2015

Michelle K. Lee
*Director of the United States Patent and Trademark Office*